United States Patent
Torres Martinez

(10) Patent No.: US 9,737,966 B2
(45) Date of Patent: Aug. 22, 2017

(54) FASTENING TOOL FOR DYNAMICALLY FASTENING PARTS FOR MACHINING

(71) Applicant: Manuel Torres Martinez, Pamplona (ES)

(72) Inventor: Manuel Torres Martinez, Pamplona (ES)

( * ) Notice: Subject to any disclaimer, the term of this patent is extended or adjusted under 35 U.S.C. 154(b) by 181 days.

(21) Appl. No.: 14/394,837

(22) PCT Filed: Mar. 15, 2013

(86) PCT No.: PCT/ES2013/070173
§ 371 (c)(1),
(2) Date: Oct. 16, 2014

(87) PCT Pub. No.: WO2013/160504
PCT Pub. Date: Oct. 31, 2013

(65) Prior Publication Data
US 2015/0084255 A1    Mar. 26, 2015

(30) Foreign Application Priority Data
Apr. 24, 2012    (ES) .................................. 201200431

(51) Int. Cl.
*B23Q 3/08*    (2006.01)
*B23Q 1/76*    (2006.01)

(52) U.S. Cl.
CPC ........ *B23Q 1/766* (2013.01); *B23Q 2220/008* (2013.01); *B23Q 2240/005* (2013.01)

(58) Field of Classification Search
CPC .............. B23Q 1/766; B23Q 2240/005; B23Q 2220/008
See application file for complete search history.

(56) References Cited

U.S. PATENT DOCUMENTS

| 3,587,391 A | | 6/1971 | Pitts et al. | |
| 5,283,982 A | * | 2/1994 | Harper, Jr. ................ | B23C 3/00 |
| | | | | 451/11 |
| 5,934,626 A | * | 8/1999 | Collins, Jr. ........ | B23K 37/0538 |
| | | | | 248/132 |

(Continued)

FOREIGN PATENT DOCUMENTS

ES    2313115 T3    3/2009

OTHER PUBLICATIONS

English translation of the International Preliminary report on patentability (Written Opinion) dated Sep. 4. 2013.

*Primary Examiner* — Monica Carter
*Assistant Examiner* — Nirvana Deonauth
(74) *Attorney, Agent, or Firm* — Lucas & Mercanti, LLP

(57) ABSTRACT

The present invention relates to a fastening tool for dynamically fastening parts for machining, said tool being formed by an annular frame (1) which is fastened to a rotary supporting means (2) arranged around the location of the machining tool (4) on a tool-holder head (3). The annular frame (1) incorporates a tamper formed by a rotating ball (5) and, in a diametrically opposite position, a tilting clamp (6) which incorporates a counter-tamper formed by another rotating ball (8). According to the invention, a cantilevered portion (9.1) of a part can be seized between the balls (5) and (8) of the tamper and counter-tamper in order to prevent bending and vibrations in relation to same during machining.

3 Claims, 8 Drawing Sheets

(56) References Cited

U.S. PATENT DOCUMENTS

| | | | |
|---|---|---|---|
| 7,971,917 B2* | 7/2011 | Ge | ............... E21B 19/161 |
| | | | 166/85.1 |
| 8,137,379 B2* | 3/2012 | Labash | ............... A61H 39/04 |
| | | | 269/3 |
| 2004/0175244 A1 | 9/2004 | Otten | |

* cited by examiner

FASTENING TOOL FOR DYNAMICALLY FASTENING PARTS FOR MACHINING

CROSS REFERENCE TO RELATED APPLICATION

This Application is a 371 of PCT/ES2013/070173 filed on Mar. 15, 2013 which, in turn, claimed the priority of Spanish Patent Application No. 201200431 filed on Apr. 24, 2012 both applications are incorporated herein by reference.

FIELD OF THE ART

The present invention relates to machining panel-type parts that can bend, proposing a fastening tool for fastening cantilevered portions of said parts during the action of machining those portions, which allows performing operations of edge finishing, drilling, etc., with precision and quality.

STATE OF THE ART

To assure the fastening of parts with large surface dimensions that can bend, such as panels for aeronautical fuselages, wind turbine blades, etc., in conditions suitable for performing machining on said parts, there are known solutions for flexible or rigid tools which, by means of screwed fixings, vacuum systems or other fixing techniques, allow establishing the support and fastening of the parts, withstanding the stress resulting from the machining performed on said parts.

As a complement to said support tools, the use of hold-down elements coupled to the machining head is also known, whereby better positioning can be assured, for example, to drill perpendicular to the part of application. These hold-down elements basically comprise a bushing which surrounds the machining tool and advances independently of said tool until contacting with the part to be machined, applying stress perpendicular to same such that, once it is in place, the hold-down element senses its position and feeds this information to the control of the machining system. Nevertheless, these hold-down elements can only work together with a sufficiently rigid static fastening tool for fastening the part being machined.

There are solutions of this type in numerical control machines for drilling, but they cannot be applied for working on cantilevered areas on the contour of panels or similar parts that are located outside the support on the fastening tool for fastening the part and can bend due to the pressure applied while machining, giving rise to geometrical machining errors. Furthermore, said solutions do not serve for edge finishing trimming operations on cantilevered areas of part edges.

OBJECT OF THE INVENTION

The invention proposes a tool that allows dynamically fastening cantilevered portions of panels or parts to perform edge finishing trimming operations or other machining operations on said cantilevered portions with precision and effectiveness.

This tool object of the invention comprises an annular frame which is coupled to a rotary supporting means incorporated in rotating assembly around the arrangement of the tool on a machining tool-holder head, there being incorporated in said annular frame a tamper formed by a rotating ball and, attached in an articulated manner in a diametrically opposite position on the same annular frame, a clamp which can tilt due to the action of an actuator cylinder, said clamp incorporating a counter-tamper formed by another rotating ball, in a position facing the ball of the tamper incorporated in the annular frame.

A tool is therefore obtained which allows, by means of the tilting of the clamp, forming an opening for inserting a cantilevered portion of a part to be machined between the tamper and the counter-tamper and then clamping said cantilevered portion of the part to be machined between the tamper and the counter-tamper, in order to perform the machining that has to be performed by fastening the mentioned cantilevered portion, which prevents the bending and vibration thereof due to the stress resulting from machining.

Since the cantilevered portion of the part to be machined is clamped between the rotating ball of the tamper and the rotating ball of the counter-tamper, fastening is done dynamically, i.e., the fastening clamping can be moved by rolling following the travelling movement of the machining tool, constantly keeping the fastening of the part close to the point where machining is performed at all times.

Furthermore, by means of a programmed control of the rotating movement of the rotary supporting means, machining movements with changes in direction can be followed, likewise constantly maintaining the fastening of the part close to the machining point, for example, to perform edge finishing trimming operations on successive edges of the part of application.

In addition, the annular frame incorporating the tamper and the clamp holding the counter-tamper is coupled to the rotary supporting means incorporated in the machining tool-holder head by means of a detachable fastening, which allows decoupling said annular frame with the elements it incorporates to use the tool-holder head in machining operations on other portions of the parts of application that are not cantilevered.

Said tool object of the invention therefore has very advantageous features for machining operations on cantilevered portions of parts that can bend or vibrate, acquiring its own identity and preferred character with respect to other conventional means for said function.

DETAILED DESCRIPTION OF THE INVENTION

Figure 1:
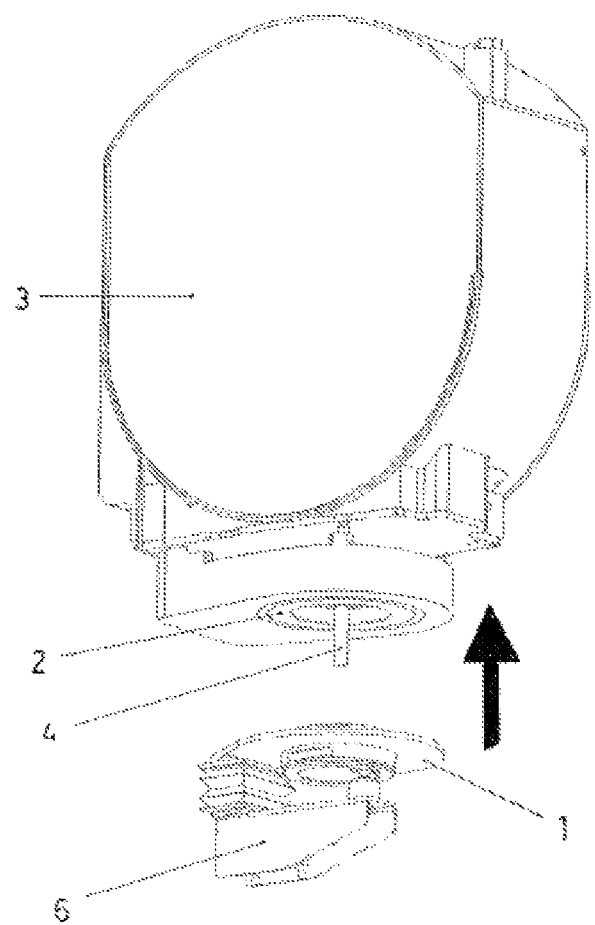
FIG. 1 shows a perspective view of a machining tool-holder head with a tool according to the object of the invention located in the position facing the coupling thereof on the tool-holder head.
Figure 2:
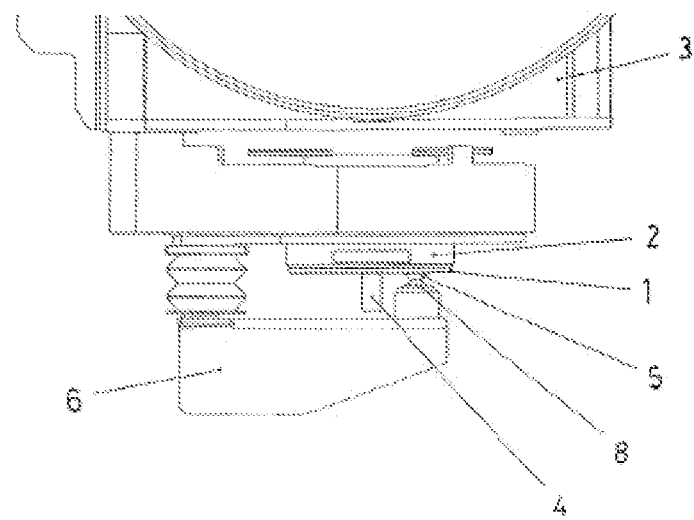
FIG. 2 is a side detail view of the tool of the invention coupled on the tool-holder head which is only partially depicted.

The present invention relates to a fastening tool for machining cantilevered portions of parts that can bend and vibrate to prevent machining defects that may be caused by bending or vibration of those cantilevered portions of parts during machining.

The proposed tool comprises an annular frame (1) which is coupled by fastening to a rotary supporting means (2) incorporated in rotating assembly on a tool-holder head (3), said supporting means (2) surrounding the position of the location of the tool (4) on said tool-holder head (3), which can be a drill bit, a milling cutter, a water jet sprayer, or any other type of conventional tool for making holes, removing material, cutting, etc.

The annular frame (1) incorporates a tamper formed by a rotating ball (5) and, in a diametrically opposite position, there is incorporated in an articulated assembly in said annular frame (1) a clamp (6) which can tilt by means of operating with an actuator cylinder (7), said clamp (6) incorporating a counter-tamper formed by another rotating ball (8) facing the ball (5) of the tamper of the annular frame (1).

Figure 3:
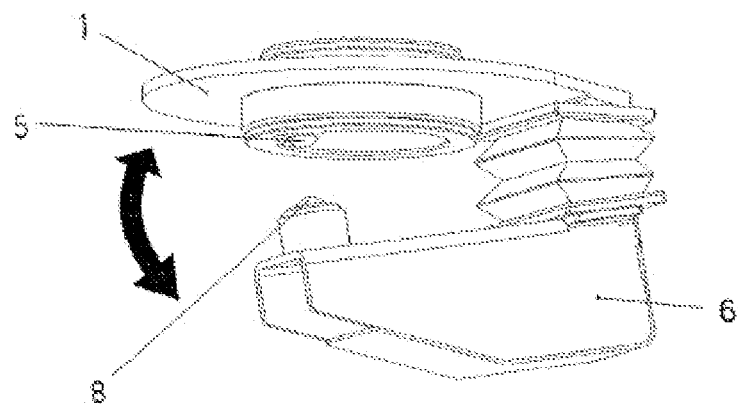
FIG. 3 is a perspective view of the annular frame incorporating the tamper and the clamp holding the counter-tamper, with the clamp in a position in which the tamper and counter-tamper are separated from one another.
Figure 5:
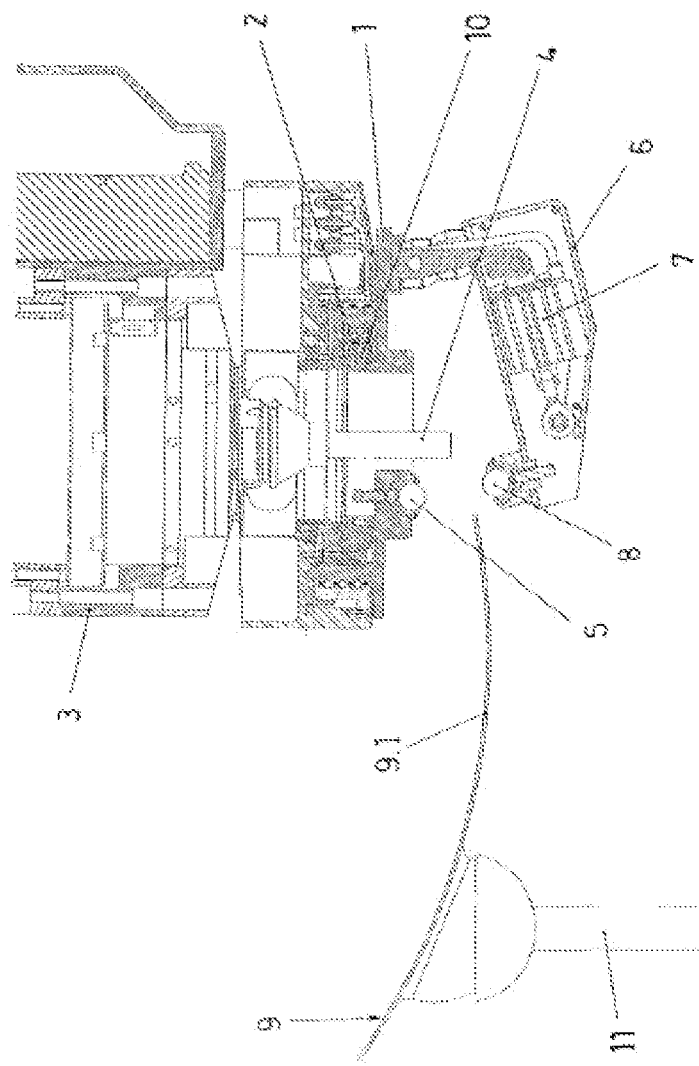
FIG. 5 is a sectioned side view of the tool coupled on a tool-holder head in the position for the insertion of a cantilevered portion of a part to be machined between the tamper and the counter-tamper.

Therefore, by means of operating with the actuator cylinder (7), the clamp (6) can be made to tilt such that the balls (5) and (8) of the tamper and counter-tamper are separated from one another, as shown in FIG. 3, which allows inserting in the intermediate space between said balls (5) and (8) a cantilevered portion (9.1) of a part (9) to be machined, as seen in FIG. 5.

Figure 4:
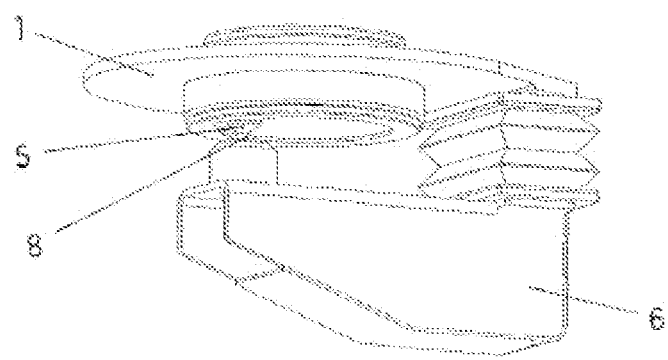
FIG. 4 is a perspective view like the previous view, with the clamp in a position in which the tamper and the counter-tamper are supported against one another.
Figure 6:
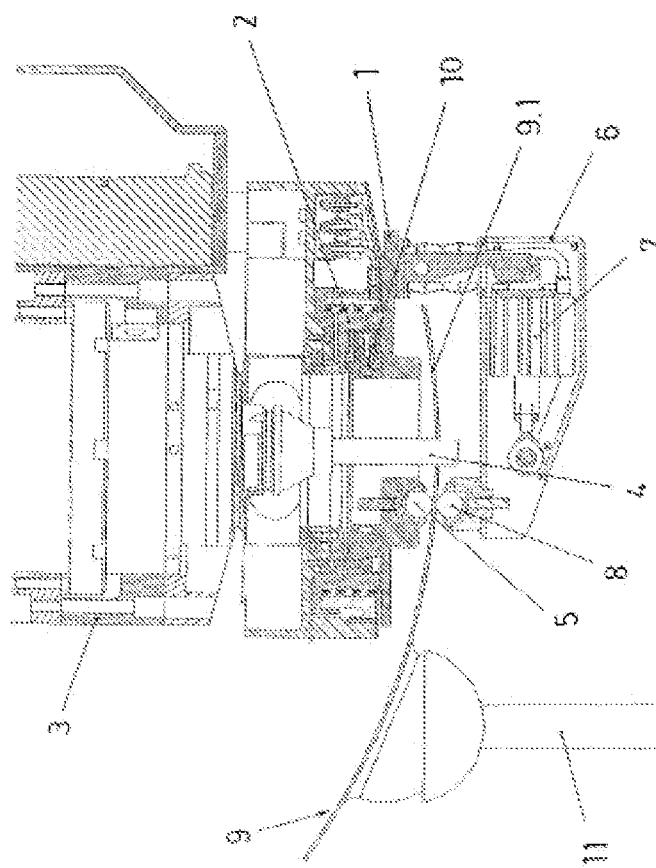
FIG. 6 is a view like the previous view, with the cantilevered portion of the part to be machined clamped between the tamper and the counter-tamper.

Likewise, by means of operating with the actuator cylinder (7), the clamp (6) can be made to tilt so that the balls (5) and (8) of the tamper and counter-tamper apply pressure on one another, as shown in FIG. 4, which allows clamping between said balls (5) and (8) the cantilevered portion (9.1) of a part introduced between them, as seen in FIG. 6.

Said clamping between the balls (5) and (8) allows performing machining operations on the cantilevered portion (9.1) of a part, keeping said portion (9.1) perfectly fastened close to the actuation point of the machining tool (4), whereby preventing bending and vibrations of said cantilevered portion (9.1) of a part being machined.

Figure 7:
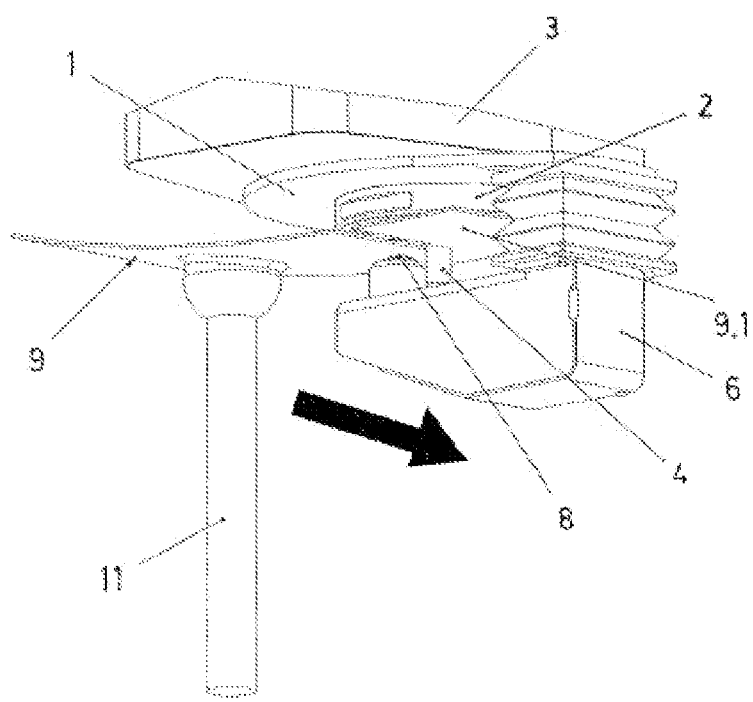
FIG. 7 shows a perspective view of a detail of the edge finishing trimming operation of a cantilevered portion of a part with dynamic fastening by means of the tool of the invention.

The fastening of the clamping between the balls (5) and (8) is furthermore a dynamic fastening because the rotation of said balls (5) and (8) determines a rolling which allows the maintaining the movement of the fastening on the cantilevered portion (9.1) of a part, accompanied by the travelling movement of the tool (4), whereby edge finishing trimming operations, for example, can be performed along the cantilevered portion (9.1) of a part thus fastened, constantly maintaining the fastening conditions close to the actuation point of the tool (4), as seen in FIG. 7.

Figure 8:
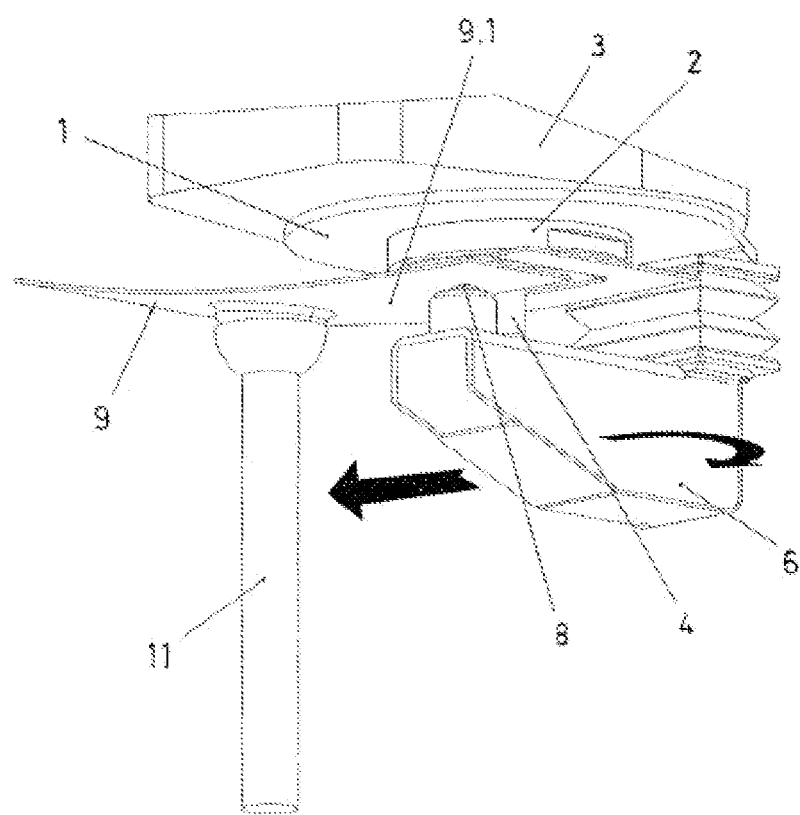
FIG. 8 is a detail like the previous detail, showing a change in direction of the edge finishing trimming operation on the part of application.

The rotation of the rotary supporting means (2) is controlled by a programmed control, for example, a numerical control, to turn the fastening tool assembly according to the machining passes to be made, which thereby allows performing, for example, edge finishing trimming operations following passes in variable consecutive directions, as seen in FIG. 8, without the fastening tool running into the cantilevered portion (9.1) of a part being trimmed.

Figure 9:
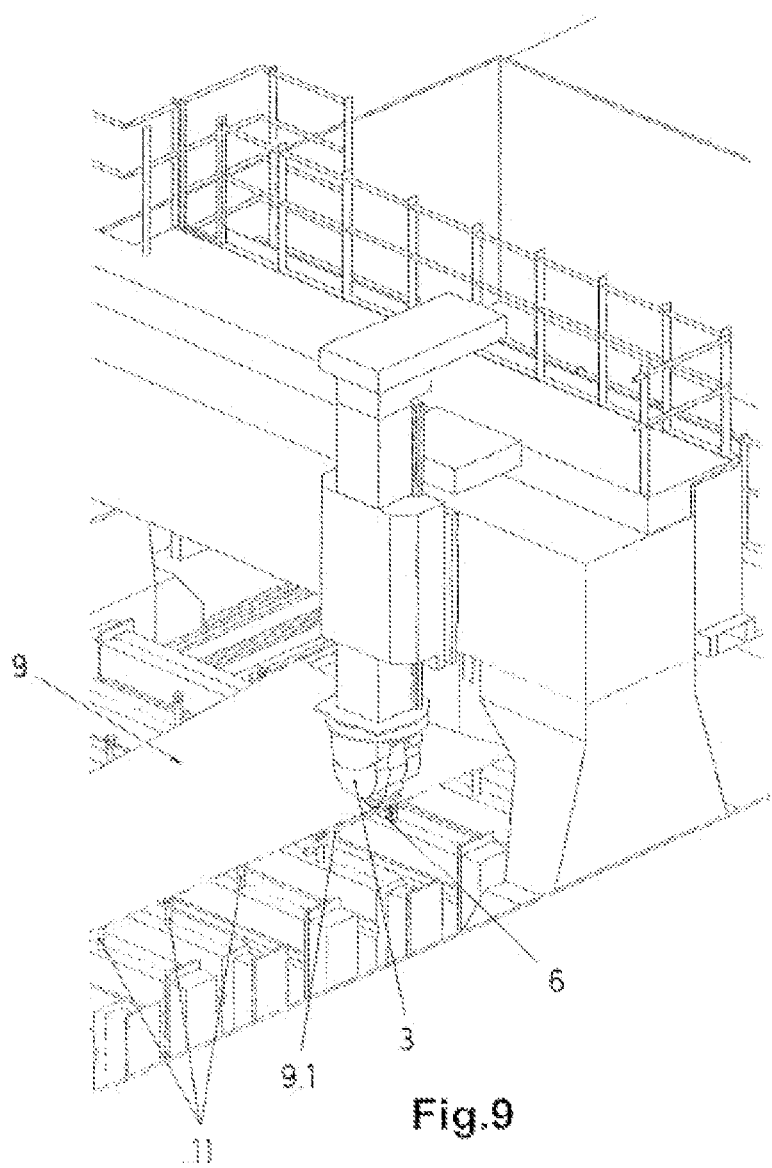
FIG. 9 is a partial perspective view of a machining machine provided with the tool of the invention, showing the edge finishing trimming operation of a part arranged on a flexible structural support assembly.

In addition, the coupling of the assembly of the annular frame (1) on the rotary supporting means (2) is established with axial retention by means of a pneumatic lock (10) which allows releasing the retention to remove the annular frame (1) together with the elements incorporated therein, thereby enabling use of the tool-holder head (3) without the fastening tool to perform machining operations on portions of parts (9) that are not cantilevered, which can be arranged, for example, on a flexible structural support assembly (11) of support, as seen in FIG. 9, without this being a limiting feature.

The invention claimed is:

1. A fastening tool for dynamically fastening a part for machining to prevent bending and vibrations of cantilevered portions of the part, the fastening tool comprising:
   a tool-holder head comprising:
      a machining tool; and
      a rotary support coupled to the tool-holder head, the rotary support being arranged proximate the machining tool;
   a single annular frame detachably coupled to the rotary support, the annular frame comprising:
      a first rotating ball; and
      an articulated assembly including a clamp comprising a second rotating ball wherein the clamp is adapted to move between a first position in which the first rotating ball is separated from the second rotating ball, and a second position in which the first rotating ball is proximate to the second rotating ball,
   wherein the clamp has an actuator cylinder that allows tilting the clamp between a position in which the first rotating ball and the second rotating ball are separated and a position in which the first rotating ball and the second rotating ball apply pressure on one another.

2. The fastening tool for dynamically fastening parts for machining according to claim 1, wherein the rotary support has a programmed control to turn the tool for fastening in machining passes following variable consecutive directions.

3. The fastening tool for dynamically fastening parts for machining according to claim 1, wherein the single annular frame is detachably coupled to the rotary support with axial retention by a pneumatic lock which allows releasing the axial retention to remove said annular frame from the tool-holder head.

* * * * *